M. C. SCHWEINERT & H. P. KRAFT.
TIRE VALVE.
APPLICATION FILED AUG. 21, 1915.

1,251,585.

Patented Jan. 1, 1918.

WITNESSES:
René Buine
Fred White

INVENTORS:
Maximilian Charles Schweinert,
and Henry P. Kraft,
By Attorneys,
Fraser, Burk & Myers

UNITED STATES PATENT OFFICE.

MAXIMILIAN CHARLES SCHWEINERT, OF WEST HOBOKEN, AND HENRY P. KRAFT, OF RIDGEWOOD, NEW JERSEY.

TIRE-VALVE.

1,251,585.  Specification of Letters Patent.  Patented Jan. 1, 1918.

Application filed August 21, 1915. Serial No. 46,639.

*To all whom it may concern:*

Be it known that we, MAXIMILIAN CHARLES SCHWEINERT, of West Hoboken, in the county of Hudson and State of New Jersey, and HENRY P. KRAFT, of Ridgewood, in the county of Bergen and State of New Jersey, both citizens of the United States of America, have invented certain new and useful Improvements in Tire-Valves, of which the following is a specification.

This invention relates to tire valves and aims to provide certain improvements therein.

In the use of so-called demountable rims, that is to say, rims which are constructed of metal and are adapted to be detachably secured in place on the felly of the wheel, it is customary to use a short valve which projects but little beyond the inner face of the rim, in order to facilitate the operations of mounting and demounting the rim. Nevertheless when the rim is in place on the wheel it is desirable to have a portion of the valve projecting through the wooden felly in order that the tire may be pumped, during running.

The object of the present invention is to provide a two-part valve, one part of which constitutes the short valve hereinbefore referred to, and the other part of which is an extension adapted to be connected with the short valve with a leak-tight joint. By this means the tire can be inflated when in place upon the wheel. An important feature of the invention is the provision of means whereby the tire can be deflated under like conditions, and also by means of which a gage can be applied to the valve when the tire is in place upon the wheel to determine pressures within the tire. The invention includes certain other features of improvement which will be hereinafter more fully described.

Referring to the drawings which illustrate several embodiments of the invention,—

Figure 1:
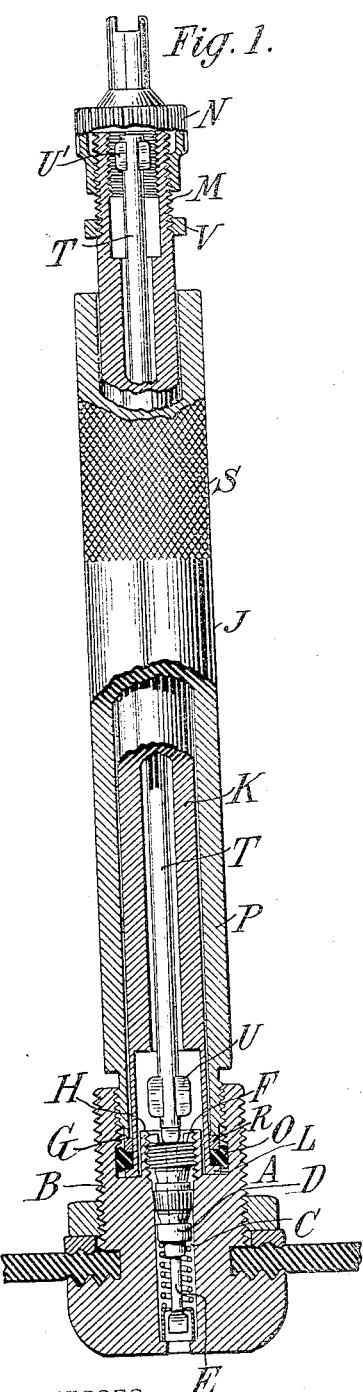
Figure 1 is a central vertical section partly in elevation, showing the preferred form of our invention.

Referring to the drawings, let A illustrate a valve of the type hereinbefore referred to. The valve A comprises a shell B having the usual foot at its bottom and screw-threaded sides by which it is attached to the inner tube of the tire. The shell B is formed with a valve chamber C within which operates a valve member D connected to a pin E which extends upwardly to a point near the top of a valve plug F, these parts constituting the usual well-known Schrader valve. The shell B is formed at its upper part with an enlarged recess G into which projects a portion H of the casing B which is threaded to receive the plug F.

The extension as a whole is indicated by the letter J and comprises a shell member K, the lower part of which is adapted to extend into the recess G and is formed with a flange L. The upper part of the shell is formed with the usual screw-threaded exterior M designed to receive a valve cap M.

Means are provided for making a tight joint between the shell K and the casing B in such manner as to avoid relative rotation of the packing O which is interposed between the shell K and the casing. In the construction shown this means comprises a sleeve P closely surrounding the shell K and adapted to make a screw-threaded engagement with the walls of the casing B. Between the lower end of the shell P and the packing O is interposed an anti-friction washer R so that when the extension is applied to the valve casing it is only necessary to screw the sleeve P into the casing, thus squeezing the packing into the position shown wherein it makes a tight joint between the casing and the shell. To facilitate this operation the sleeve is provided at its upper or outer end with a knurled portion S.

Within the shell K we mount a rod T, the lower end of which is adapted to engage the pin E of the valve D, and the upper end of which extends to a point close to the top of the shell K. The rod T is adapted to be used for the purpose of pressing down the valve D whereby the tire may be deflated while it is on the wheel. The rod T also serves the important function of enabling the use of the ordinary tire gage in connection with demountable tires. Such gages are provided with an abutment or pin which in the case of the ordinary valve contacts directly with the valve stem and opens the tire valve. In the type of valve shown, however, the valve stem is inaccessible and the rod T serves as a connecting medium by means of which the valve may be opened. A further important function of the rod T is for use in connection with inflation of tires from storage tanks or reservoirs. In this operation it is usual to provide a coupling piece which manually depresses the valve so as to avoid the necessity of overcoming the valve spring with the air under pressure. According to the present invention the rod T is irremovably coupled to the shell K; this is preferably done by swaging the rod at its bottom and top, as shown at U U', so that the diameters of the swaged portions are larger than the bore of the shell whereby the rod is prevented from escape. The invention also provides a construction in which the sleeve P is coupled to the shell K so that separation of these parts is prevented. The flange L serves the purpose in the present construction of preventing the removal of the sleeve in one direction while its removal in another direction is prevented by a collar V which is shown as screwed down over the upper end of the shell. Preferably the collar V is jammed in place so that it is not easily removable.

Figure 2:
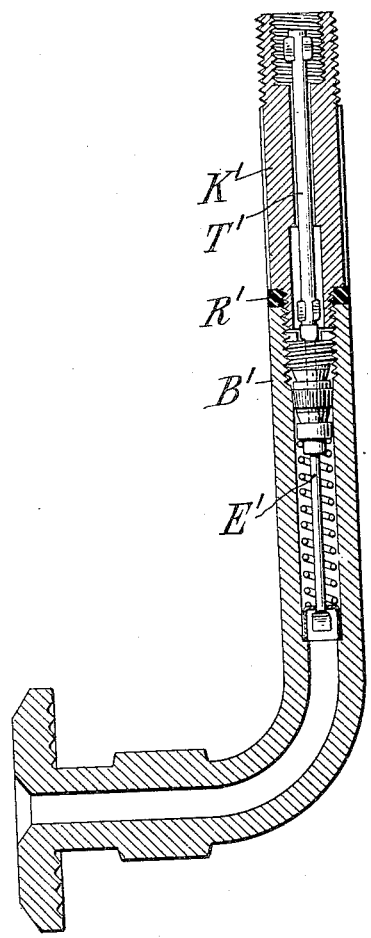
Fig. 2 is a similar section of a modified construction.

In the construction shown in Fig. 2 the invention is adapted to a type of valve in which the valve shell is turned at an angle to its foot. This type of valve which is used in connection with tires of special construction cannot ordinarily have a sufficient degree of projection from the rim to render it accessible for use with a gage. The invention may be applied to this type in the manner illustrated wherein the shell K' is adapted to directly screw into the end of the valve casing B', while the rod T' is located as before within the shell and is adapted to contact with the upper end of the valve stem E'. In the present instance the use of the sleeve S is omitted, so that the shell corresponds in diameter to that of the casing. In this instance the packing R' is located directly between the shell and the valve casing.

While we have shown and described several embodiments of the invention, it will be understood that we do not wish to be limited thereto since various changes can be made therein without departing from the invention.

What we claim is:—

1. In a tire valve or the like, the combination of a valve casing comprising two parts, one of which is connected to the inner tube and the other of which forms an extension of the first, and has a passage for leading air to said other part which is connected to the air-tube, means for detachably coupling the two parts together, a valve proper in the lower part having a stem shorter than the valve casing, and a rod within said extension adapted to contact at its lower end with said valve proper whereby to open the same.

2. In a tire valve or the like, the combination of a valve casing comprising two parts, one of which is connected to the inner tube and the other of which forms an extension of the first, and has a passage for leading air to said other part which is connected to the air-tube, means for detachably coupling the two parts together, a valve proper in the lower part having a stem shorter than the valve casing, a rod within said extension adapted to contact at its lower end with said valve proper whereby to open the same, and means for coupling said rod to said extension whereby to prevent separation thereof.

3. In a tire valve or the like, the combination of a valve casing comprising two parts, one of which is connected to the inner tube and the other of which forms an extension of the first, and has a passage for leading air to said other part which is connected to the air-tube, means for detachably coupling the two parts together, a valve proper in the lower part having a stem shorter than the valve casing, a rod within said extension adapted to contact at its lower end with said valve proper whereby to open the same, and means for irremovably coupling said rod to said extension whereby to prevent separation thereof.

4. In a tire valve or the like, the combination of a valve casing comprising two parts, one of which is connected to the inner tube and the other of which forms an extension of the first, means for detachably coupling the two parts together, a valve proper in the lower part, a rod within said extension adapted to contact at its lower end with said valve proper whereby to open the same, means for irremovably coupling said rod to said extension whereby to prevent separation thereof, and a sleeve surrounding said extension and adapted to screw in the lower of said parts.

5. In a tire valve or the like, the combination of a valve casing comprising two parts, one of which is connected to the inner tube and the other of which forms an extension of the first, means for detachably coupling the two parts together, a valve proper in the lower part, a rod within said extension adapted to contact at its lower end with said valve proper whereby to open the same, means for irremovably coupling said rod to said extension whereby to prevent separation thereof, a sleeve surrounding said extension and adapted to screw in the lower of said parts, and means for coupling said sleeve to said extension so as to prevent separation thereof.

6. In a tire valve or the like, the combination of a valve casing comprising two parts, one of which is connected to the inner tube and the other of which forms an extension of the first, said extension being in line with said first part and having an inflating nipple at its top, a valve proper in said lower part, and a rod within said extension detached from and adapted to contact at its lower end with said valve proper and having its upper end extended to said nipple.

7. In a tire valve or the like, the combination of a valve casing comprising two parts, one a short part adapted to be fastened to the inner tube and containing a valve proper, and the other being an extension adapted to pass through the felly and being connected to said first part, a pump nipple at the end of said extension, and a rod passing through said extension detached from said valve proper and contacting at its lower end with said valve proper and having its upper end lying within said nipple.

8. In a tire valve or the like, the combination of a valve casing, said valve casing having a recess, a valve proper therein, a shell adapted to enter said recess and having a flange at its lower end, a packing above said flange, and a sleeve screwing into said recess and compressing said packing, and a rod in said shell adapted to engage said valve proper when the parts are connected.

9. In a tire valve or the like, the combination of a valve casing comprising two parts, one of which is connected to the inner tube and the other of which forms an extension of the first, and has a passage for leading air to said other part which is connected to the air-tube, means for detachably coupling the two parts together, a valve proper in the lower part, having a stem shorter than the valve casing, and a loosely-held rod within said extension adapted to contact at its lower end with said valve stem whereby to open said valve proper.

In witness whereof we have hereunto signed our names in the presence of two subscribing witnesses.

MAXIMILIAN CHARLES SCHWEINERT.
HENRY P. KRAFT.

Witnesses:
GRACE GUNDERMAN,
FRED WHITE.